United States Patent
Torii et al.

(10) Patent No.: US 6,992,409 B2
(45) Date of Patent: Jan. 31, 2006

(54) LIQUID-COOLED ROTARY ELECTRIC MACHINE INTEGRATED WITH AN INVERTER

(75) Inventors: Koshi Torii, Iwakura (JP); Seiji Nakamura, Nagoya (JP); Kazutaka Tatematsu, Toyota (JP)

(73) Assignees: Denso Corporation, Kariya (JP); Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/385,516

(22) Filed: Mar. 12, 2003

(65) Prior Publication Data

US 2003/0173839 A1    Sep. 18, 2003

(30) Foreign Application Priority Data

| Mar. 15, 2002 | (JP) | ............................. 2002-073030 |
| Jul. 1, 2002 | (JP) | ............................. 2002-192429 |
| Jul. 1, 2002 | (JP) | ............................. 2002-192430 |
| Oct. 15, 2002 | (JP) | ............................. 2002-300888 |

(51) Int. Cl.
  *H02K 9/00* (2006.01)

(52) U.S. Cl. ......................................... 310/52; 310/54

(58) Field of Classification Search ............... 310/52, 310/54, 58, 64

See application file for complete search history.

(56) References Cited

U.S. PATENT DOCUMENTS

| 4,739,204 A | * | 4/1988 | Kitamura et al. ......... 310/68 D |
| 6,169,344 B1 | * | 1/2001 | Tsuruhara .................... 310/58 |
| 6,617,715 B1 | * | 9/2003 | Harris et al. .................. 310/54 |

FOREIGN PATENT DOCUMENTS

| EP | 0 503 093 A1 | 9/1992 |
| JP | A-4-33542 | 2/1992 |
| JP | A 5-95606 | 4/1993 |
| JP | A 5-292703 | 11/1993 |
| JP | A-6-70508 | 3/1994 |
| JP | A 6-113493 | 4/1994 |
| JP | A 7-288950 | 10/1995 |
| JP | A-8-251872 | 9/1996 |
| JP | A 10-234159 | 9/1998 |
| JP | A-11-18372 | 1/1999 |
| JP | A-4-145859 | 5/1999 |

(Continued)

Primary Examiner—Darren Schuberg
Assistant Examiner—Nguyen Hanh
(74) Attorney, Agent, or Firm—Oliff & Berridge, PLC (57) ABSTRACT

A rotary electric machine includes a rotor for rotation around a rotational axis, a stator core that has a cylindrical shape and includes a slot therein, a cooling unit having a coolant passage, and a casing that accommodates the rotor and the stator core. A stator coil is inserted in the slot of the stator core and has a coil end protruded from a side face of the stator core. An electric part is mounted on the cooling unit and controls a current of the stator core. The rotor is rotatably supported inside of the stator core. The cooling unit cools both the stator core and the electric part. The cooling portion is accommodated in spacing defined by the side face of the stator core and an outer circumference wall of the coil end.

18 Claims, 9 Drawing Sheets

FOREIGN PATENT DOCUMENTS

| | | | |
|---|---|---|---|
| JP | A-11-146606 | 5/1999 | |
| JP | A 11-164521 | 6/1999 | |
| JP | A 11-225485 | 8/1999 | |
| JP | A 2000-60036 | 2/2000 | |
| JP | A-2000-83351 | 3/2000 | |
| JP | A-2000-125512 | 4/2000 | |
| JP | A 2000-245170 | 9/2000 | |
| JP | A 2001-36001 | 2/2001 | |
| JP | A-2001-86706 | 3/2001 | |
| JP | A 2001-86769 | 3/2001 | |
| JP | A 2002-33447 | 1/2002 | |
| JP | B2 3271416 | 1/2002 | |
| JP | A 2002-43508 | 2/2002 | |

* cited by examiner

LIQUID-COOLED ROTARY ELECTRIC MACHINE INTEGRATED WITH AN INVERTER

CROSS REFERENCE TO RELATED APPLICATION

This application relates to and incorporates herein by reference Japanese Patent Applications No. 2002-73030 filed on Mar. 15, 2002, No. 2002-192429 filed on Jul. 1, 2002, No. 2002-192430 filed on Jul. 1, 2002, and No. 2002-300888 filed on Oct. 15, 2002.

FIELD OF THE INVENTION

The present invention relates to a liquid-cooled rotary electric machine integrated with an inverter.

BACKGROUND OF THE INVENTION

Recently, many rotary electric machines for an automotive vehicle are proposed. For example, Japanese Patent No. A-05-292703 proposes a liquid-cooled rotary electric machine integrated with an inverter, which cools both an inverter and a motor with a coolant. In this rotary electric machine, the inverter is fixed on the sidewall of the motor through a heat sink, and includes a semiconductor switching device and a smoothing capacitor. The heat sink cools both the motor and the inverter. However, the smoothing capacitor is big so that a large area is needed to attach the smoothing capacitor. Thus, a principal plane of the heat sink, where the smoothing capacitor is attached, necessarily becomes large. In addition, the semiconductor switching device generates a large amount of heat, so that the device needs to be cooled sufficiently. Therefore, the rotary electric machine has to be improved for a smaller size, lighter weight, and higher cooling performance.

SUMMARY OF THE INVENTION

The present invention has objects to reduce size and weight and to promote a cooling performance of a rotary electric machine, more particularly, the cooling performance for cooling both an electric part and a motor.

In the present invention, a rotary electric machine includes a rotor, a stator core, a stator coil, a casing, a cooling unit, and an electric part. The rotor is rotatably supported inside of the stator core so that the rotor rotates around a rotational axis of the rotary electric machine. The stator core has a cylindrical shape and includes a slot therein. The stator coil is inserted in the slot of the stator core, and has a coil end protruded from a side face of the stator core. The casing accommodates the rotor and the stator core. The electric part is mounted on the cooling unit and controls a current of the stator core. The cooling unit includes a coolant passage so that the cooling unit cools both the stator core and the electric part. The cooling unit is accommodated in spacing defined by the side face of the stator core and an outer circumference wall of the coil end.

Although the above spacing is normally a redundant space, the spacing is used as an accommodation space for the cooling unit effectively. Therefore, the rotary electric machine becomes compact. Further, the cooling unit can be compact, so that the rotary electric machine reduces weight. Moreover, the cooling unit contacts both the stator core and the electric part, so that the cooling performance for cooling both the electric part and the stator core can be promoted.

Furthermore, the coil end of the stator coil and the electric part are disposed closely, so that a wiring resistance loss and an electromagnetic radiation noise can be reduced.

Preferably, the rotor, the stator core, the stator coil, and the like form an alternating current motor. More preferably, the electric part forms an inverter unit. The inverter unit is disposed on an axial end of the motor, and controls electric power delivery between an external direct current power supply and the stator coil of the motor. Here, the inverter unit includes a semiconductor switching device, a smoothing capacitor, and a cooling unit. The cooling unit has first and second surfaces, where the first surface faces the motor, and the second surface is opposite to the first surface.

The semiconductor switching device is disposed between the external direct current power supply and the stator coil, and forms an inverter circuit for converting direct current to alternating current or alternating current to direct current. The semiconductor switching device is mounted on the first surface of the cooling unit so that the semiconductor switching device is cooled by the cooling unit. The smoothing capacitor connects to a direct current terminal of the inverter circuit, and is mounted on the second surface of the cooling unit so that the smoothing capacitor is cooled by the cooling unit.

In the above inverter unit, both surfaces are used as principal planes for cooling both the semiconductor switching device and the smoothing capacitor, so that the rotary electric machine with the inverter can be downsized and lightened. Moreover, the semiconductor switching device does not face the motor, so that the semiconductor switching device is cooled sufficiently.

More preferably, the inverter unit includes first, second, and third busbars, first and second electric parts. Here the first and second electric parts forms the above inverter circuit. The first busbar is mounted on the surface of the cooling unit through an insulation sheet. The first electric part is mounted on the first busbar. The second busbar includes a body mounted on the surface of the cooling unit through the insulation sheet and a leg protruded from the body. The second electric part is mounted on the body of the second busbar. The third busbar is mounted on the surface of the cooling unit. A bottom face of the leg of the second busbar is connected to a top face of the first electric part, and the second busbar has a predetermined step between the body and the leg of the second busbar. A bottom face of the third busbar is connected to a top face of the second electric part.

In this case, a heat generated by the first electric part conducts the first and second busbars through the top and bottom faces of the first electric part, so that the first semiconductor device is cooled sufficiently by the cooling unit through the first and second busbars. Similarly, the second electric part is also cooled sufficiently by the cooling unit through the second and third busbars.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
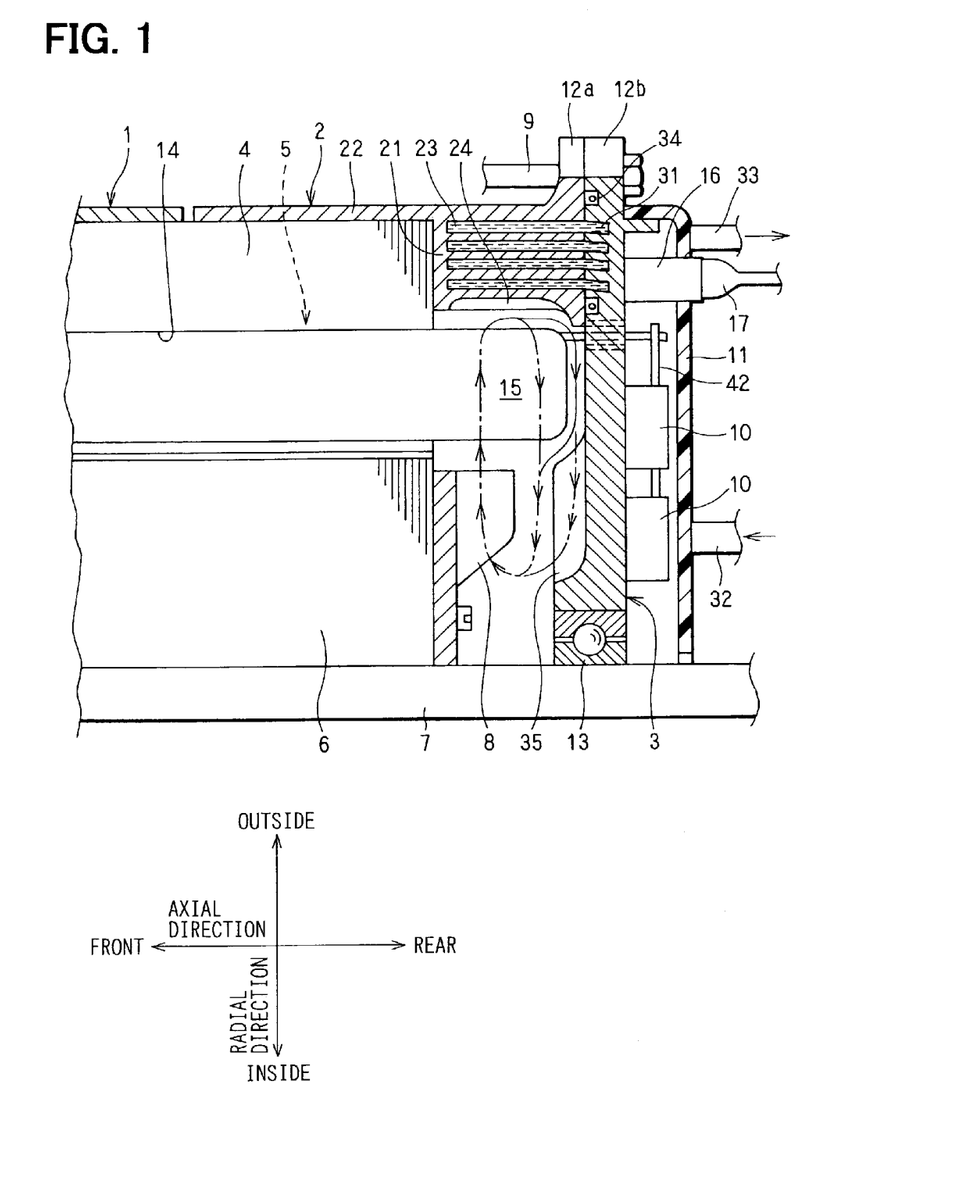
FIG. 1 is a schematic partially cross-sectional view showing a rotary electric machine according to a first embodiment of the present invention.

A rotary electric machine according to a first embodiment is shown in FIG. 1. This rotary electric machine is a brushless three-phase DC motor, however, any other type of motor can be used as a rotary electric machine. The rotary electric machine includes a front frame 1 having a ring shape, an rear frame 2 having a ring shape, an rear plate 3 having a ring plate shape, a stator core 4, a stator coil 5, a rotor 6, a rotational shaft 7, a cooling fan 8, a through bolt 9, a semiconductor switching device 10, and a cover 11. A front plate (not shown), the front frame 1, the rear frame 2, and the rear plate 3 are formed by aluminum die-casting method. The front plate has almost the same structure as the rear plate 3 does, and the front frame 1 has the same structure as the rear frame 2 does. The front plate connects to the front frame 1, similar to a connection between the rear plate 3 and the rear frame 2.

Each collar 12a, 12b is protruded from each radial outside end of the rear frame 2 and the rear plate 3, respectively. Each collar 12a, 12b has a through hole (not shown). Similarly, other collars (not shown) are protruded from the radial outside ends of the front frame 1 and the front plate. The other collars have also through holes (not shown). A through bolt 9 is installed through each through hole of the collars 12a, 12b, respectively. The front plate, the front frame 1, the rear frame 2, the stator core 4, and the rear plate 3 are assembled in this order, and are bolted by the through bolt 9 with a nut.

A bearing 13 is disposed on the inside end of the rear plate 3, another bearing (not shown) is also disposed on the inside end of the front plate. These bearings 13 support the rotational shaft 7 rotatably. The rotor 6 is fixed and interlocked to the rotational shaft 7, and faces the stator core 4 with a gap for electromagnetic field.

The stator coil 5 is interlocked in a slot 14, which is formed on an inner circumference wall of the stator core 4. The rear end of the stator coil 5 in the axial direction is protruded from the stator core 4, so that a coil end 15 of the stator coil 5 is formed. The cooling fan 8 is fixed to the rear end of the rotor 6. In this embodiment, the cooling fan 8 is a centrifugal fan.

An electronic control unit for controlling a current of the stator coil 5 is fixed to the rear side of the rear plate 3. The control unit includes the semiconductor switching device 10 having a three-phase inverter circuit. The cover 11 has a ring plate shape with a collar head, and is fixed to the rear side of the rear plate 3 so that the cover 11 covers the control unit.

A connector 16 is fixed to the rear side of the rear plate 3, and is protruded from the rear plate 3 through the cover 11. The connector 16 connects to a DC power supply cable 17 and to a signal cable (not shown). The rotary electric machine communicates an external system with the signal cable. The DC power supply cable 17 supplies an electric power to the control unit through the connector 16, a busbar 42, and the like.

A cooling system of the front side of the rotary electric machine is almost the same as a cooling system of the rear side of the rotary electric machine. Therefore, the cooling system of the rear side of the rotary electric machine is described as follows. As shown in FIG. 1, a body 21 and a cylinder 22 form the rear side of the rear frame 2. The body 21 has a cylindrical shape, and is accommodated in a space that is defined by the stator core 4, the coil end 15, and the rear plate 3. The cylinder 22 has a cylindrical shape, and is protruded from the body 21 to the front side. A coolant passage 23 is formed in the body 21, and is a helical passage. The coolant passage 23, for example, is formed with quadruplet. The coolant passage 23 has openings on the rear side of the body 21. The coolant passage 23 connects to another coolant passage 31 through the openings. The front side of the body 21 has no opening of the coolant passage 23. The coolant passage 31 is formed in the rear plate 3, and is a helical passage. The rear side of the rear plate 3 has no opening of the coolant passage 31.

One end of the coolant passage 31 connects to a coolant inlet pipe 32, and the other end the coolant passage 31 connects to a coolant outlet pipe 33. Both the coolant inlet and outlet pipes 32, 33 are connected to an external pump (not shown), so that coolant is circulated by the external pump. Liquid or gas coolant can be used as the coolant. An O-ring 34 is disposed in a ring groove of the rear plate 3, and prevents the coolant from leaking.

The body 21 is crimped to the rear side of the stator core 4 by the through bolt 9 and the nut. The inner circumference wall of the cylinder 22 contacts the outer circumference wall of the stator core 4 with thermo-conduct grease. Therefore, the stator core 4 is cooled with the coolant circulating the coolant passages 23, 31. A space having a teacup shape is formed between the body 21 and the coil end 15.

The cooling fan 8 raises a blow. The blow blows to the coil end 15 and the body 21 through the space, and is cooled with the coolant. A cooling fin 24 is formed on the inner circumference wall of the body 21, and cools the blow sufficiently. Then, the blow blows along the front side of the rear plate 3 and is also cooled by a cooling fin 35 of the rear plate 3. After that, the blow comes back to the cooling fan 8. This flow of the blow is indicated by arrow in FIG. 1.

The coolant cools the rear plate 3, which is also used as a heat sink of the semiconductor switching device 10. Therefore, the semiconductor switching device 10 mounted on the rear side of the rear plate 3 is cooled with the coolant sufficiently. The coolant prevents the bearing 13 from overheating.

Figure 2:
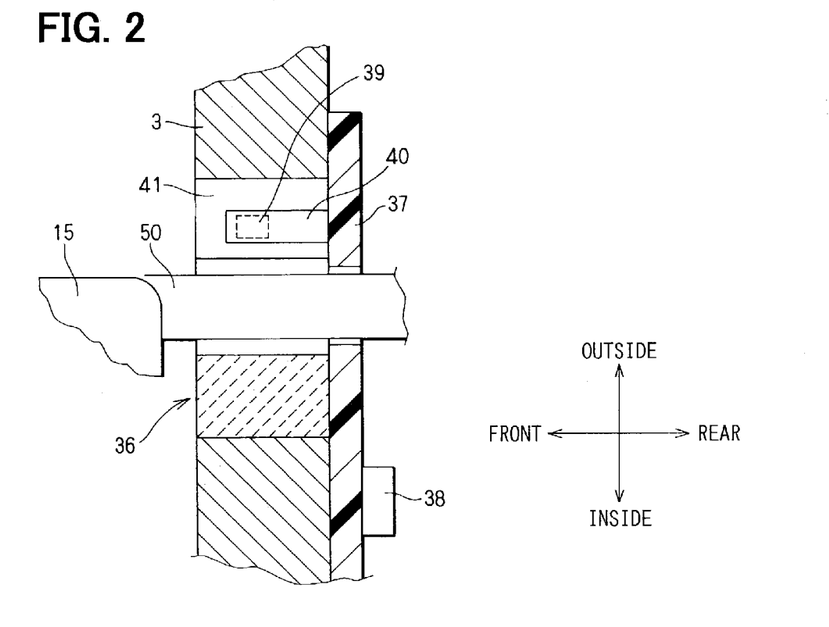
FIG. 2 is a partially enlarged cross-sectional view showing the rotary electric machine shown in FIG. 1.

A wiring of the stator coil 5 is as a three-phase lead 50 shown in FIG. 2. A through hole (not shown) for retrieving the three-phase lead 50 is formed in the rear plate 3. A ferrite core 36 is mounted in the through hole of the rear plate 3. The ferrite core 36 has a C-shape with a notch. A printed circuit board 37 is fixed to the rear side of the rear plate 3. An electric part 38 as a control circuit is mounted on the printed circuit board 37. A current detector 40 built in a Hall element 39 is fixed to the front side of the printed circuit board 37, and is inserted in the notch of the ferrite core 36. As shown in FIG. 1, the three-phase lead 50 of the stator coil 5 is connected to an AC output terminal of the semiconductor switching device 10 with busbar 42 through the ferrite core 36 and the printed circuit board 37.

The body 21 as a cooling unit is accommodated in a space, which is defined by the rear frame 2, the rear plate 3, the stator core 4, and the coil end 15 of the stator coil 5. This space is normally a useless space. Therefore, the rotary electric machine according to the first embodiment becomes compact, compared with the related art. Further, the cooling unit can be compact, so that the rotary electric machine reduces weight. Moreover, the cooling unit, i.e., the body 21, contacts the stator core 4, so that the stator core 4 and the stator coil 5 mounted in the stator core 4 are cooled sufficiently by the cooling unit. Furthermore, the coil end 15 and the semiconductor switching device 10 are disposed closely, so that a wiring resistance loss and an electromagnetic radiation noise are reduced.

Figure 3:
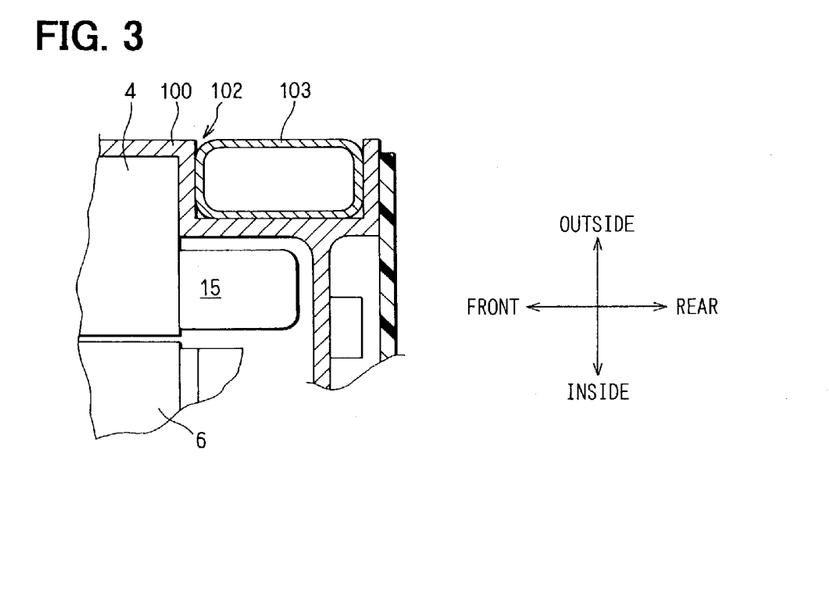
FIG. 3 is a partially enlarged cross-sectional view showing a rotary electric machine according to a modification of the first embodiment.

The first embodiment is modified as follows. As shown in FIG. 3, the rear frame 2 and the rear plate 3 are integrated to be a rear frame 100. The rear frame 100 has a cylindrical shape with a bottom. A ring groove 102 is formed outside of the rear frame 100, and a coolant pipe 103 is disposed in the ring groove 102. A coolant flows in the coolant pipe 103.

Further, although the through bolt 9 bolts the parts of the rotary electric machine, it is preferred that two bolts are used instead of the through bolt 9. In this modification, the first bolt with a nut bolts the front plate and the front frame 1, the second bolt with a nut bolts the rear plate 3 and the rear frame 2. Even when the first bolt is unfastened, the coolant does not leak from the coolant passage 23, 31.

Further, a space between the coil end 15 and the body 21 may be filled with a good heat conductive material such as a resin mold. In this case, the cooling performance of the stator coil 15 will be more promoted.

(Second Embodiment)

Figure 4:
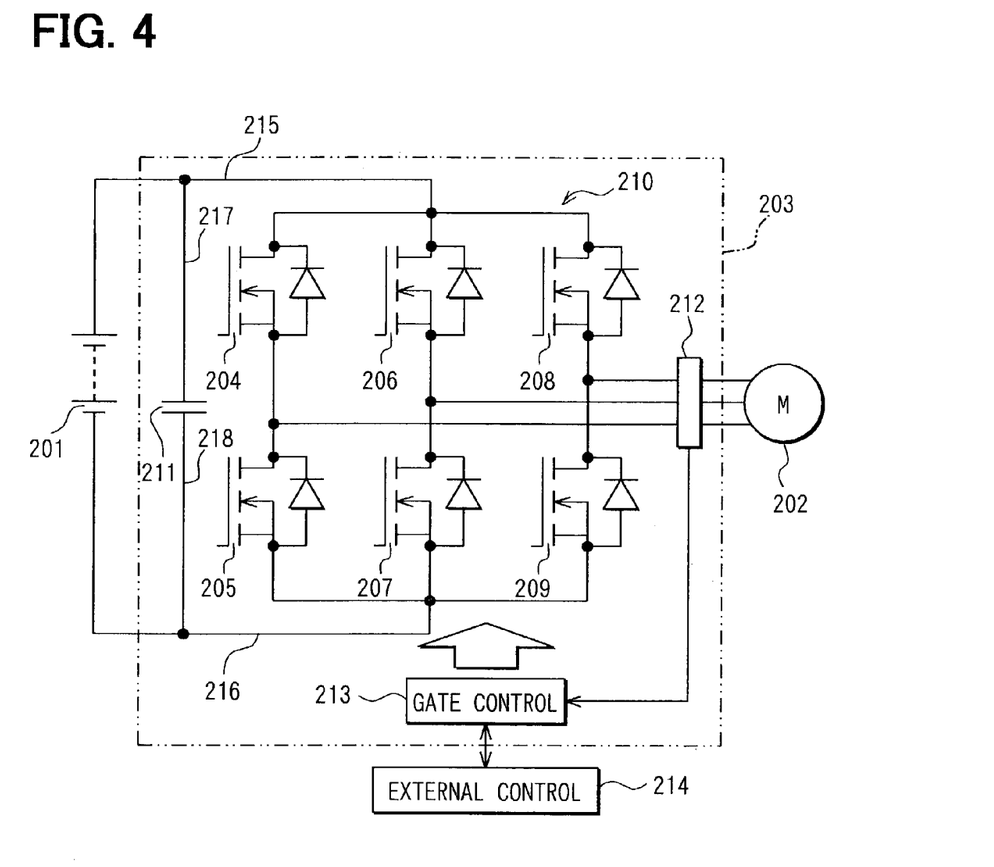
FIG. 4 is a circuit diagram showing a control unit for a rotary electric machine according to a second embodiment of the present invention.

A rotary electric machine according to a second embodiment has an electric circuit configuration shown in FIG. 4. The electric circuit includes a battery 201, a motor 202, and an inverter unit 203 as a control unit. The motor 202 is a three-phase synchronous motor, and the inverter unit 203 converts direct current (i.e., DC) to alternating current (i.e., AC) or AC to DC between the battery 201 and the motor 202, so that electric power is delivered between the battery 201 and the motor 202, i.e., the inverter unit 203 is used as a regeneration unit.

The inverter unit 203 includes a three-phase inverter circuit 210, a smoothing capacitor 211, a current detector 212, and a gate controller 213. The three-phase inverter circuit 210 includes semiconductor switching devices 204–209, which includes metal-oxide semiconductor transistor (i.e., MOS transistor). The gate controller 213 as a micro-computer control device outputs an information signal of the inverter unit 203 to an external control system 214, receives a torque information command from the external control system 214, and calculates a current data detected by the current detector 212, so that the gate controller 213 controls the motor 202 with a duty control of the three-phase inverter circuit 210.

The smoothing capacitor 211 absorbs a voltage change generated by on/off control of the semiconductor switching devices 204–209, so that an electric potential change on DC lines 215, 216 is suppressed. Thus, deterioration of the battery 201 and an electromagnetic radiation noise are reduced. A line 217 connects a positive terminal of the smoothing capacitor 211 to the higher potential DC line 215. A line 218 connects a negative terminal of the smoothing capacitor 211 to the lower potential DC line 216.

Figure 5:
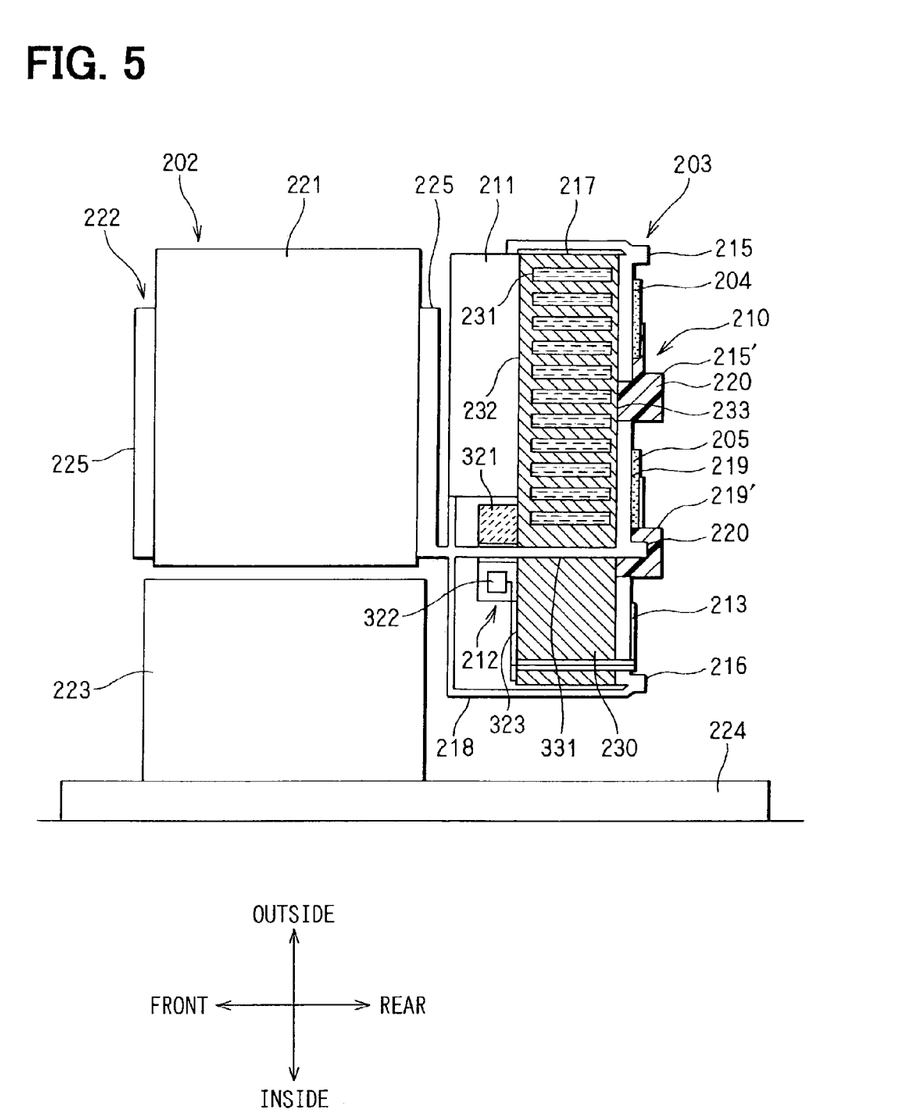
FIG. 5 is a partially cross-sectional view showing the rotary electric machine according to the second embodiment.

As shown in FIG. 5, the motor 202 includes a stator core 221, a stator coil 222, a rotor 223 having a permanent magnet, and a rotational shaft 224. The stator coil 222 is inserted in the stator core 221, and includes a coil end 225. The stator core 221 is fixed to a housing (not shown). The rotor 223 is interlocked and fixed to the rotational shaft 224. The rotational shaft 224 is rotatably supported with the housing.

A heat sink 230 is a main component of the inverter unit 203, and is used as a cooling unit. The heat sink 230 is fixed to the housing, and has a square plate shape. A coolant passage 231 is disposed in the heat sink 230. More particularly, the coolant passage 231 is disposed from almost center to outside in the radial direction of the heat sink 230, but is not disposed on the inside of the heat sink 230. The heat sink 230 faces the coil end 225 of the stator coil 222 with a predetermined spacing therebetween, and has front and rear faces 232, 233 as principal planes. A smoothing capacitor 211 and a current detector 212 are disposed on the front face 232. The smoothing capacitor 211 is adjacent to the coolant passage 231. The current detector 212 includes a ferrite core 321 having a C-shape with a notch and a Hall element 322 accommodated in the notch of the ferrite core 321. A three-phase lead 331 is installed through a center hole of the ferrite core 321, and is protruded from the coil end 225 of the stator coil 222 in the axial direction. The three-phase lead 331 is also installed through the heat sink 230, and is protruded from the rear face 233 of the heat sink 230. Semiconductor switching devices 204–209 forming a three-phase inverter circuit 210, a gate controller 213, and conductive wires for connecting the devices 204–209 to the gate controller 213 are disposed on the rear face 233 of the heat sink 230.

The semiconductor switching devices 204–209 are adjacent to the coolant passage 231. A DC line 215 as a conductive wire is mounted on a thin insulating sheet on the rear face 233 of the heat sink 230, and has a higher electric potential. A DC line 216 as a conductive wire is mounted directly on the rear face 233 of the heat sink 230, and has a lower electric potential. The DC line 216 can be also mounted on a thin insulating sheet on the rear face 233. Three-phase lead of the three-phase inverter circuit 210 is mounted on a thin insulating sheet on the rear face 233 of the heat sink 230. The three-phase lead includes three leads, and, for example, one of them is a U-phase lead 219. The three-phase lead is formed of flat copper wire.

The semiconductor switching devices 205, 207, 209 are disposed on the inside of the rear face 233 of the heat sink 230, and connect to an AC line. The semiconductor switching devices 204, 206, 208 are disposed on the outside of the rear face 233 of the heat sink 230, and connect to the DC line 215. The three-phase lead 331 of the stator coil 322 includes three leads and connects to the three-phase lead of the three-phase inverter circuit 210, respectively, for example, to the U-phase lead 219. The connection between the three-phase lead 331 of the stator coil 322 and the above three-phase lead of the three-phase inverter circuit 210 is covered with a resin member 220.

A line 215' connects a lower potential electrode of the semiconductor switching device 204 and the DC line 215. A line 219' connects a lower potential electrode of the semiconductor switching device 205 and the DC line 216. The DC line 215 connects to a higher potential electrode of the smoothing capacitor 211 through a line 217. The DC line 216 connects to a lower potential electrode of the smoothing capacitor 211 through a line 218.

The gate controller 213 is mounted on the DC line 216, but is insulated to the DC line 216. The gate controller 213 receives a detection signal from the Hall element 322 through a line 323 that is insulated to the heat sink 230. Then, the gate controller 213 applies a controlling voltage to each gate electrode of the semiconductor switching devices 204–209 through each line (not shown).

In the second embodiment, the front and rear faces 232, 233 of the heat sink 230 are used as principal planes for cooling both the semiconductor switching devices 204–209 and the smoothing capacitor 211, so that the heat sink 230 is downsized. Moreover, a total length of the rotary electric machine in the axial direction is substantially shortened, compared with a double-layer type rotary electric machine, in which the semiconductor switching devices are mounted on the heat sink and the smoothing capacitor is mounted on the semiconductor switching devices on the heat sink. Moreover, the cooling performance of the semiconductor switching devices 204–209 promotes more than a case that the smoothing capacitor 211 is mounted on the rear face 233 and the semiconductor switching devices 204–209 are mounted on the front face 232, which is opposite to the second embodiment. That is, because the semiconductor switching devices 204–209 need to be cooled more than other electric parts. If not, the semiconductor switching devices 204–209 are much affected by a heat generated by the motor 202 and then the semiconductor switching devices 204–209 are heated and operated faulty.

The heat sink 230 can have any shape, as long as the heat sink 230 has a pair of principal planes extending in the radial direction. Moreover, air cooling system or liquid cooling system can be used as the cooling unit. Although the motor 202 in the second embodiment has the above structure, other types of AC motor can be used.

(Third Embodiment)

Figure 6:
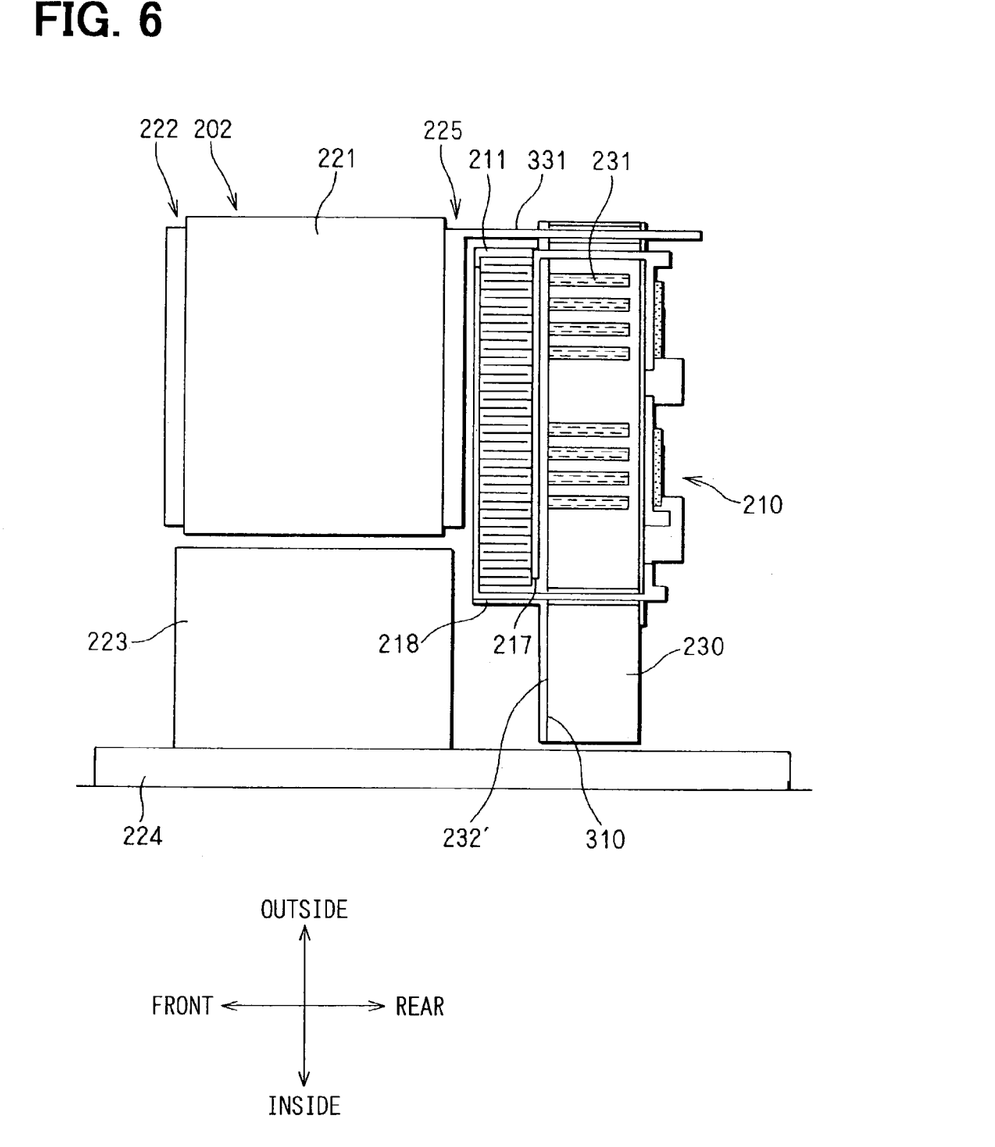
FIG. 6 is a partially cross-sectional view showing a rotary electric machine according to a third embodiment of the present invention.
Figure 7:
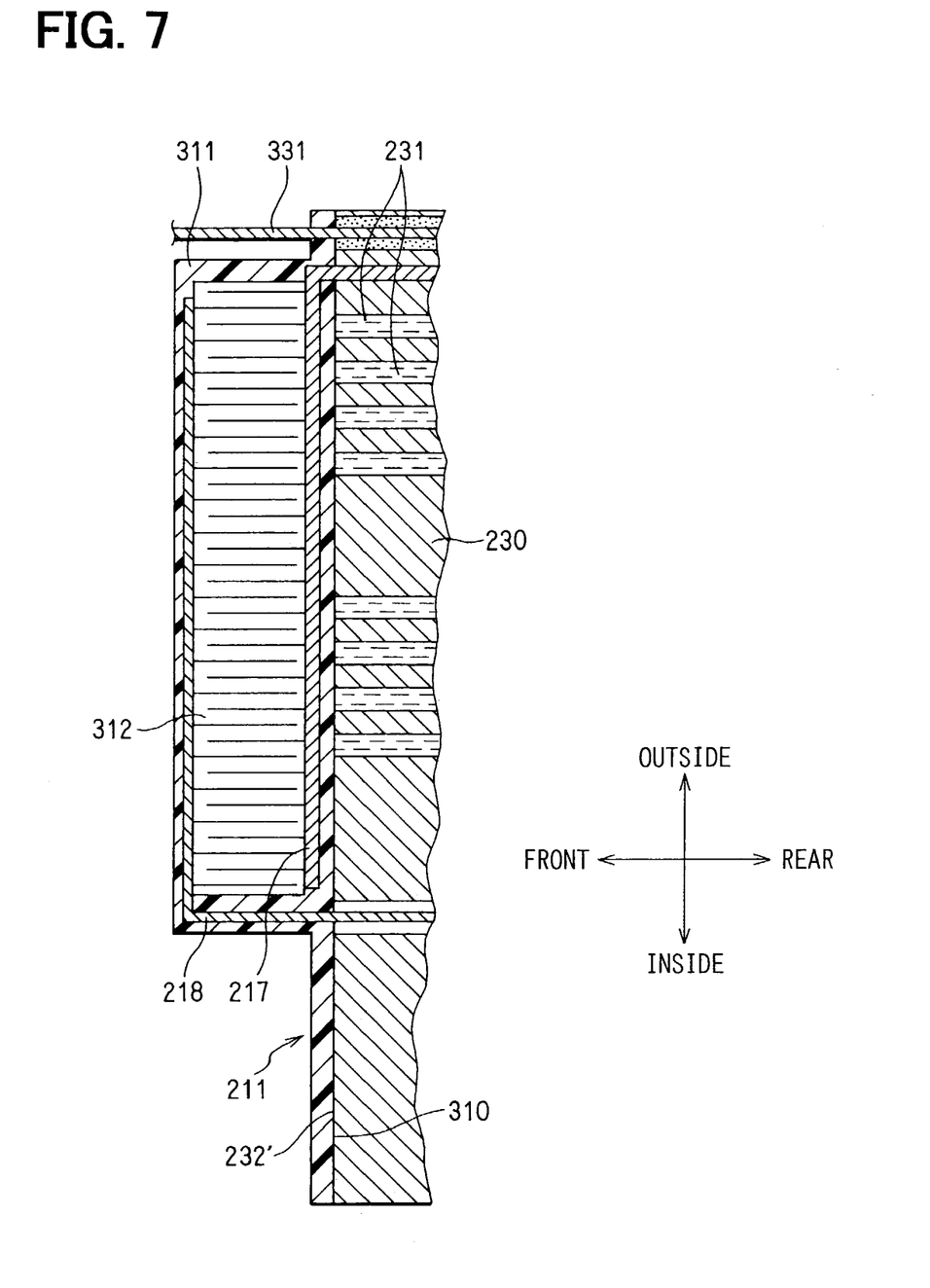
FIG. 7 is a partially enlarged cross-sectional view showing the rotary electric machine shown in FIG. 6.

A rotary electric machine according to a third embodiment is shown in FIGS. 6 and 7. This rotary electric machine has a characteristics that a coolant passage 231 has openings on a front face 232' of the heat sink 230, and a flat surface 310 of a smoothing capacitor 211 adheres to the front face 232' so that the openings of the coolant passage 231 are closed by the flat surface 310 of the smoothing capacitor 211.

In detail, the smoothing capacitor 211 is a film capacitor, and includes a dielectric film and an electrode assembly 312 in FIG. 7, which is a pair of electrodes sandwiching the dielectric film. The electrode assembly 312 is accommodated in a resin casing 311. A rear face of the resin casing 311 forms the flat surface 310 of the smoothing capacitor 211, and is adhered to the coolant passage 231. The heat sink 230 having the coolant passage 231 is formed by aluminum die casting method, for example.

Although a bonding between the flat surface 310 of the smoothing capacitor 211 and the front face 232' of the heat sink 230 is performed by resin bonding method, another bonding method can be used. For example, a metal film is deposited on the flat surface 310 of the smoothing capacitor 211 by vacuum evaporation method or bonding method, so that the metal film on the smoothing capacitor 211 is soldered to the heat sink 230. Moreover, the smoothing capacitor 211 and the heat sink 230 can be bolted together by bolts and nuts through an O-ring. Beside, these bolts can be used as a bolt that fixes the heat sink 230 to the motor housing.

Although the front face 232' of the heat sink 230 has a flat surface, a concave can be formed on the front face 232' of the heat sink 230 so that the resin casing 311 of the smoothing capacitor 211 is inserted and fitted into the concave of the heat sink 230. This method is used instead of the bonding between the smoothing capacitor 211 and the heat sink 230.

(Fourth Embodiment)

Figure 8:
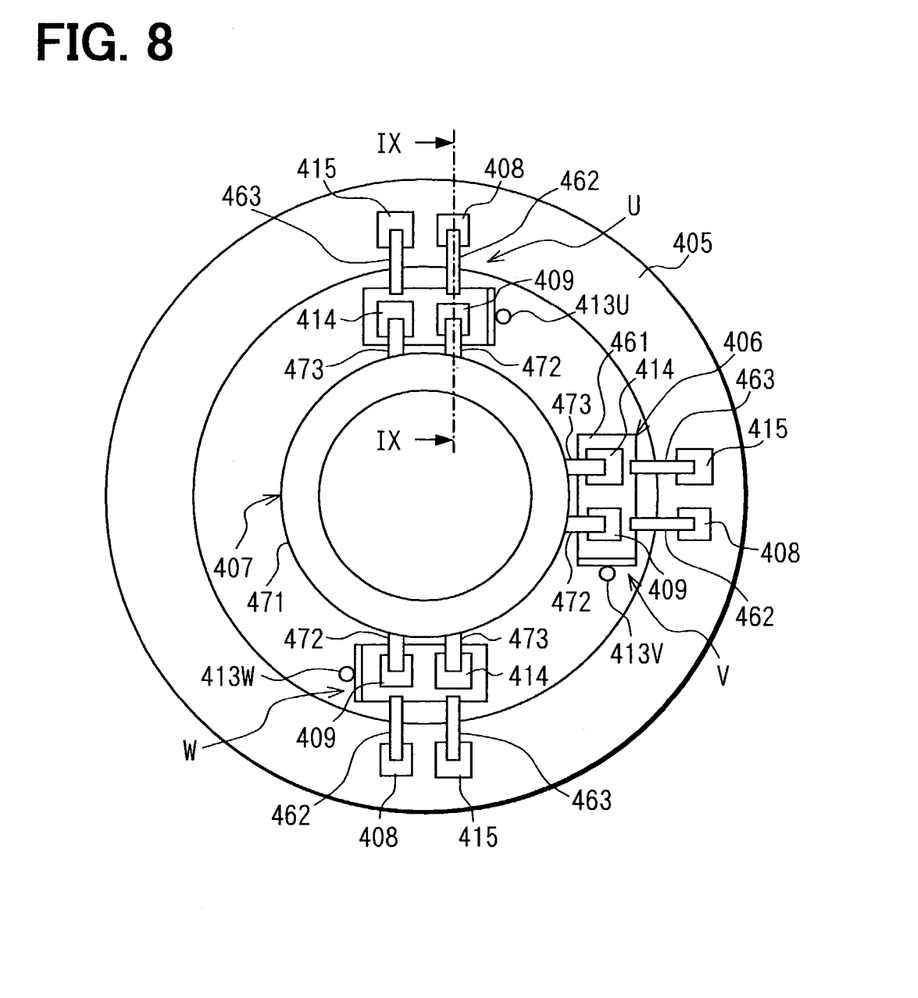
FIG. 8 is a rear view showing a rotary electric machine according to a fourth embodiment of the present invention.
Figure 9:
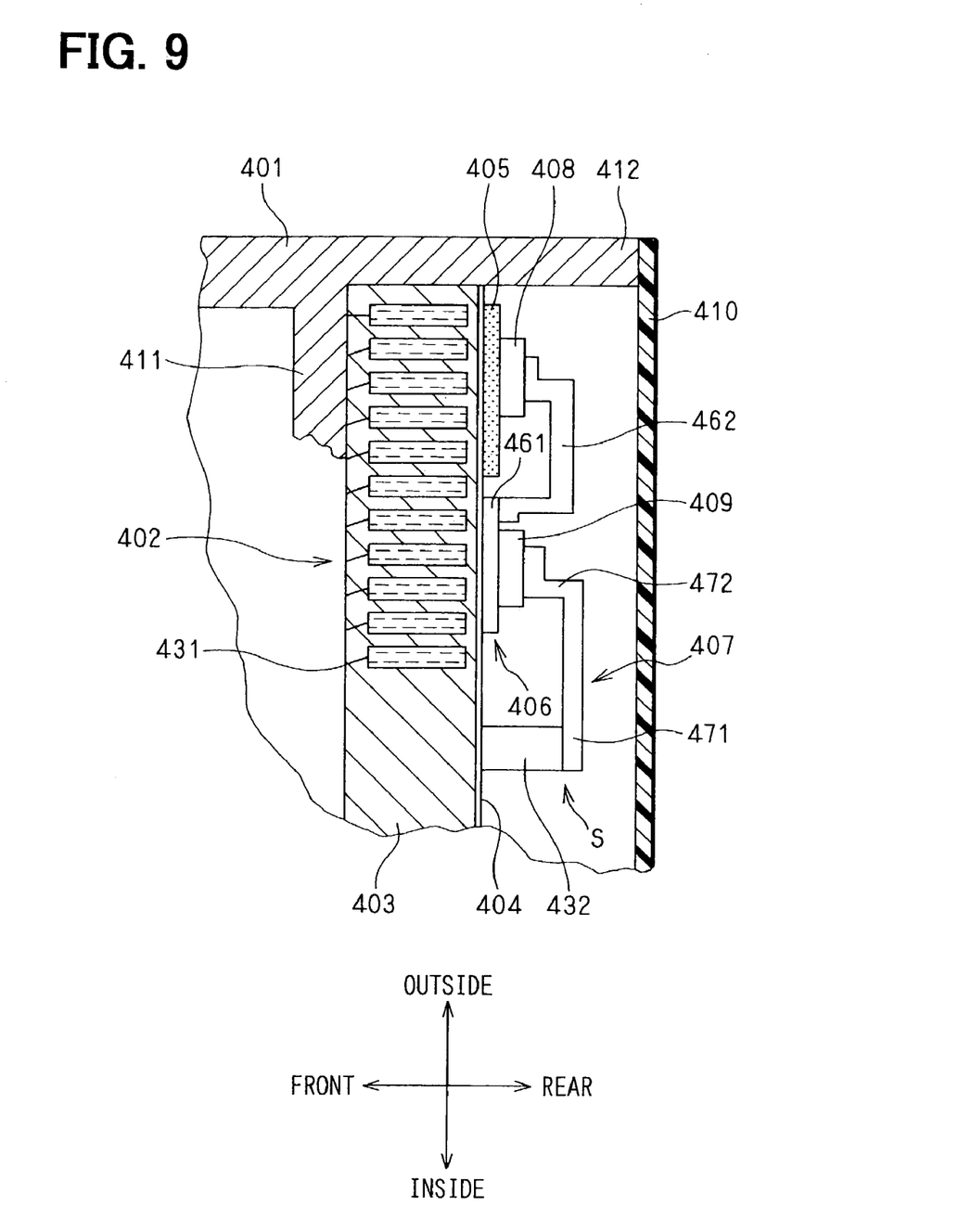
FIG. 9 is a partially enlarged cross-sectional view showing the rotary electric machine taken along line IX—IX in FIG. 8.

A rotary electric machine according to a fourth embodiment has a following structure, as shown in FIGS. 8 and 9. In FIG. 9, the rotary electric machine includes a housing 401 having a cylindrical shape and an inverter module 402. A magnetic rotor type multi-phase synchronous motor (not shown) is accommodated in the housing 401. Although not shown, the motor includes a stator core, a stator coil, a rotor, a rotational shaft, and so on. The inverter module 402 has a base plate 403, an insulating sheet 4, a power supply busbar 405, an output busbar 406, a ground busbar 407, an insulated gate bipolar transistor (i.e., IGBT) device 408 as a semiconductor switching device disposed on an upper arm, an IGBT device 409 disposed on a lower arm, and a cover 410. The housing 401 and the base plate 403 are formed by aluminum die casting method, and the cover 410 is formed by press method of aluminum thin film. The base plate 403 is fixed to a rear plate 411 of the housing 401 by a screw (not shown). The rear plate 411 is disposed on an inner circumference wall of the housing 401. A peripheral wall 412 of the housing 401 is protruded from the rear plate 411. The peripheral wall 412 is covered with the cover 410, which is made of resin. The cover 410, the rear plate 411, and the peripheral wall 412 define an accommodation space S. The inverter module 402 is accommodated in the accommodation space S.

The base plate 403 has a coolant passage 431, which has a helical passage flowing a coolant. The base plate 403 contacts the peripheral wall 412. The power supply busbar 405 and the output busbar 406 are fixed on a rear face of the base plate 403 through an insulation sheet 404. In this fixation, a well-known method is used. For example, each of the power supply busbar 405 and the output busbar 406 is coated with an insulating resin except for an electric contact area in each of the power supply busbar 405 and the output busbar 406, respectively. Then, each of the power supply busbar 405 and the output busbar 406 is fixed to the base plate 403 by a resin screw, respectively. Or the power supply busbar 405 and the output busbar 406 are press-contacted on the insulation sheet 404 by a holding plate of the base plate 403.

As shown in FIG. 9, a pillar 432 is protruded to the rear side from a predetermined position of the base plate 403. The pillar 432 connects and fixes to the ground busbar 407 at a top of the pillar 432. The power supply busbar 405 and the ground busbar 407 are disposed concentrically with a rotational shaft of the motor, as shown in FIG. 8. The output busbar 406 has almost a rectangle shape, and is disposed on the insulation sheet 404. The output busbar 406 is disposed between the power supply busbar 405 and the ground busbar 407.

The IGBT devices 408, 409 disposed on the upper and lower arms, respectively, are composed of card type modules integrating an N-channel IGBT. The card type module includes a collector terminal, an emitter terminal, and a gate terminal. The collector terminal is connected to a collector electrode of the IGBT, which is disposed on the bottom surface of the IGBT. Each of the emitter terminal and the gate terminal is connected to each of an emitter electrode and a gate electrode of the IGBT, respectively, which are disposed on upper surface of the IGBT. Side surface of the IGBT is covered with a resin mold. The gate terminal can be disposed on the upper surface of the card type module and be arranged aside the emitter terminal. Moreover, the gate terminal can be disposed on a side surface of the card type module. In FIG. 9, although the IGBT devices 408, 409 corresponding to one phase of the multi-phase inverter circuit are shown, the inverter module 402 has other four IGBT devices corresponding to remaining two phases of the multi-phase inverter circuit, as shown in FIG. 8.

In FIG. 8, a bottom terminal of the IGBT device 408 as a collector terminal is fixed on the power supply busbar 405 by a solder and the like. A bottom terminal of the IGBT device 409 is fixed on the output busbar 406 by a solder and the like. The output busbar 406 includes a body 461 and a plurality of legs 462. The IGBT device 409 is fixed to the body 461 of the output busbar 406. The leg 462 of the output busbar 406 has a tongue-like shape and extends from the body 461 to the outside of the base plate 403. The leg 462 stands at a peripheral end of the body 461 toward the cover 410, and is bent to the outside of the base plate 403. Then, the leg 462 is bent again toward the IGBT device 408, and is soldered to the emitter terminal of the IGBT device 408.

The ground busbar 407 includes a ring body 471 and a plurality of legs 472. The ring body 471 has a ring plate shape, and is mounted on the pillar 432. The leg 472 extends from the ring body 471 to the outside of the base plate 403, and is bent toward the IGBT device 409. Then, the leg 472 is soldered to the emitter terminal of the IGBT device 409. Each gate terminal of the IGBT devices 408, 409 is connected to an external controller (not shown).

As shown in FIG. 8, the inverter circuit includes the IGBT device 408 disposed on the upper arm, the IGBT device 409 disposed on the lower arm, a pair of flywheel diodes 414, 415, and three-phase inverters U, V, W. The IGBT devices 408, 409 are connected in series. Each flywheel diode 414, 415 is connected in parallel to each IGBT device 408, 409. The three-phase inverters U, V, W output different phase voltages. The IGBT device 408 is connected as a collector follower, and the IGBT device 409 is connected as an emitter follower.

The three-phase inverters U, V, W are located in a perpendicular relation to each other. Each three-phase lead 413U, 413V, 413W is protruded from each phase of the stator coil into the accommodation space S through the base plate 403 and the rear plate 411, respectively. Each three-phase lead 413U, 413V, 413W is adjacent to a side circumference wall of each body 461 of the output busbars 406, respectively. Each three-phase lead 413U, 413V, 413W are soldered to each body 461 of the output busbars 406, respectively. The IGBT device 409 on the lower arm and the flywheel diode 414 are connected to the body 461 of the output busbars 406, and are adjacent each other in the circumferential direction. The ring body 471 of the ground busbar 407 and the upper electrode of the flywheel diode 414, i.e., the anode electrode of the flywheel diode 414, are connected to a leg 473 of the ground busbar 407, which extends from the ring body 471 of the ground busbar 407. Similarly, the IGBT device 408 on the upper arm and the flywheel diode 415 are connected to the power supply busbar 405, and are adjacent each other in the circumferential direction. The body 461 of the output busbar 406 and the upper electrode of the flywheel diode 415, i.e., the anode electrode of the flywheel diode 415, are connected to a leg 463 of the output busbar, which extends from the body 461 of the output busbar 406. The power supply busbar 405 having a ring plate shape faces the base plate 403 in wide area through the insulation sheet 404. Here, the base plate 403 has the same electric potential as the ground busbar 407, so that the smoothing capacitor 416 can be reduced in it's demanded capacity.

In the fourth embodiment, heat generated by the IGBT devices 408, 409 conducts from the principal planes of the IGBT devices 408, 409 to the base plate 403 through busbars, so that the IGBT devices 408, 409 are cooled sufficiently. Moreover, the IGBT devices 408, 409 have no wire bonding for connecting, so that the output busbar 406 is downsized, a total wiring length is shortened, and the rotary electric machine is assembled easily. Further, the base plate 403 can be integrated with the rear plate 411 of the housing 401, so that the housing 401 of the motor is strengthened. Then, the rear plate 411 can be thin, and the motor can be cooled sufficiently through the rear plate 411. Further, each leg 462, 472 is deformable so that deviation of size in other parts can be absorbed by the deformation of the legs 462, 472.

Although the IGBT device is used as a semiconductor device, other semiconductor switching devices can be used. For example, a bare chip power semiconductor device can be used. In this case, a plurality of electrode plates are formed on a pair of principal planes of the bare chip power semiconductor device, and side surface of the bare chip power semiconductor device is covered with a resin coating so that a card type power semiconductor device is formed. Moreover, the power semiconductor device can include, for example, an IGBT, a metal-oxide semiconductor transistor (i.e., MOS transistor), and a flywheel diode. In other words, the flywheel diode, the IGBT and/or the MOS transistor are integrated into one card module. Further, the flywheel diode, the IGBT and/or the MOS transistor can be integrated into one semiconductor chip. As long as the power semiconductor device is mounted on the busbar, any type of power semiconductor device can be used instead of the card type power semiconductor device.

Further, the busbar is formed by lead frame method, alternatively, each busbar can be formed individually. For example, at first, a bare chip semiconductor device is bonded to a busbar, and the busbar is fixed to a heat sink through an insulating sheet. Then, the busbar is molded by resin. Moreover, a bare chip semiconductor device is bonded to a busbar, and is preliminary molded by resin so that the bare chip semiconductor device is protected by the resin mold.

Further, a plurality of electrode plates are formed on a pair of principal planes of a bare chip power semiconductor device, and side surface of the bare chip power semiconductor device is covered with a resin coating so that a card type power semiconductor device is formed. Busbars are fixed to two sides of the card type power semiconductor device, respectively. Then, the busbars are fixed to the heat sink through an insulating sheet.

Furthermore, the rear plate 411 of the motor and the inverter module 402 can be integrated together so that the motor is downsized and lightened. Moreover, by the integration, each three-phase lead can be connected in a beeline to each output busbar, respectively, so that resistance of the output busbar and the three-phase lead are reduced. Moreover, cooling performance of each semiconductor device can be substantially equalized.

(Modification of Fourth Embodiment)

Figure 10:
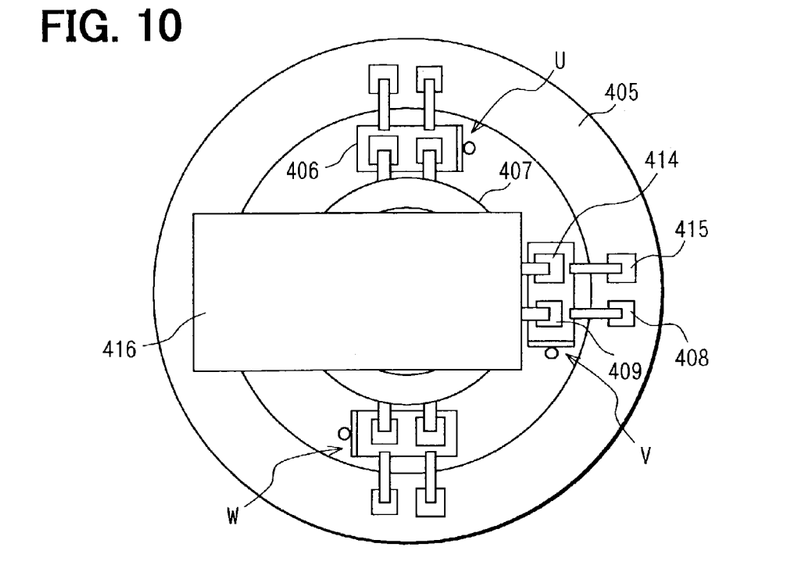
FIG. 10 is a rear view showing a rotary electric machine according to a modification of the fourth embodiment.

The fourth embodiment is modified as follows. As shown in FIG. 10, a smoothing capacitor 416 has an elliptic cylindrical shape, and is disposed on the base plate 403. The smoothing capacitor 416 and the three-phase inverter V are on the same diametric line, and the smoothing capacitor 416 is also disposed from center to outside of the base plate 403. The smoothing capacitor 416 has a positive terminal and a negative terminal (not shown). The positive terminal is connected to the power supply busbar 405 of the multi-phase inverter, and the negative terminal is connected to the ground busbar 407. A flat circumference wall of the smoothing capacitor 416 is adhered to the ground busbar 407, so that the smoothing capacitor 416 is cooled sufficiently by the coolant through the ground busbar 407. Then, the inverter module 402 can be formed compactly.

Figure 11:
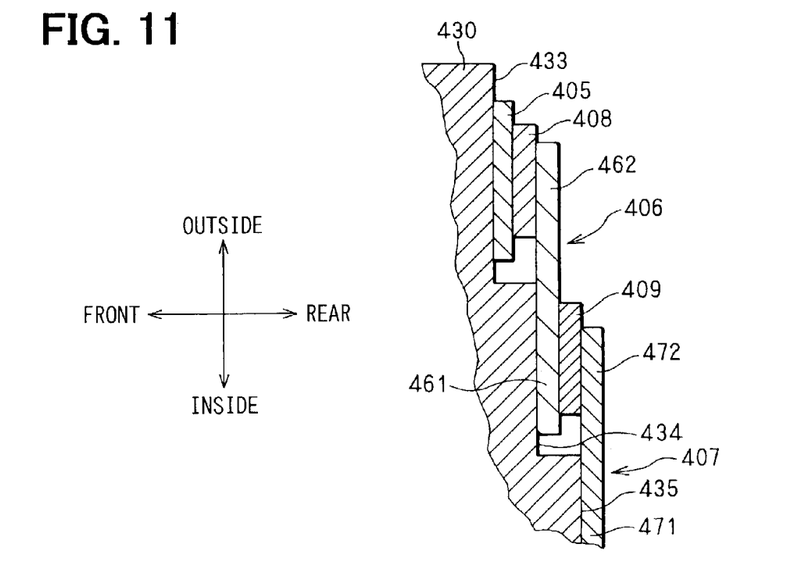
FIG. 11 is a partially enlarged cross-sectional view showing a rotary electric machine according to further modification of the fourth embodiment.

The fourth embodiment is further modified as follows. As shown in FIG. 11, a base plate 430 has a plurality of steps, so that an output busbar 406 and a ground busbar 407 can be flat. An insulation sheet is not shown in FIG. 11. The base plate 430 has a ground base 433, a second base 434 that is parallel to the ground base 433 and is higher than the ground base 433 by a predetermined height, a third base 435 that is also parallel to the second base 434 and is higher than the second base 434 by a predetermined height. An IGBT device 408 on an upper arm and a flywheel diode 415 (not shown) are disposed on the ground base 433 through a power supply busbar 405. Similarly, an IGBT device 409 on a lower arm and a flywheel diode 414 (not shown) are disposed on the second base 434 through a body 461 of an output busbar 406.

Even in this modification, the output busbar 406 has the body 461 having a ring plate shape and a plurality of legs 462 that are protruded from the body 461 to the outside of the base plate 430. The ground busbar 407 has the body 471 having a ring plate shape and a plurality of legs 472 that are protruded from the body 471 to the outside of the base plate 430. Each leg 462, 472 is deformable so that deviation of size in other parts can be absorbed by the deformation of the legs 462, 472. Moreover, the legs 462, 472 have no bending portion in the axial direction, so that manufacturing cost of the legs 462, 472 is reduced and a resistance of each leg 462, 472 is also reduced. Therefore, the cooling performance is promoted by the reduction of the resistance.

Such changes and modifications are to be understood as being within the scope of the present invention as defined by the appended claims.

What is claimed is:

1. A rotary electric machine, comprising:
   a stator core, which has a cylindrical shape and includes a slot therein;
   a rotor, which is rotatably supported inside of the stator core;
   a casing, which accommodates the rotor and the stator core;
   a stator coil, which is inserted in the slot of the stator core, and includes a coil end protruded from a side face of the stator core;
   a cooling unit, which includes a coolant passage formed directly in a body of the cooling unit;
   an electric part, which is mounted on the cooling unit, and controls the stator coil, wherein the coolant passage is accommodated in a space defined by a side face of the stator core and an outer circumference wall of the coil end, and the cooling unit contacts the side face of the stator core, wherein the coolant passage of the cooling unit is annular;
   wherein the cooling unit includes a plate and a body,
   the coolant passage is disposed in the body and has an opening,
   the opening is opened in the axial direction of the rotor, and
   the plate has a ring plate shape and adheres to the body of the cooling unit so that the plate seals the opening of the coolant passage.

2. A rotary electric machine according to claim 1, further comprising:
   a through bolt for bolting the body and the plate of the cooling unit and the stator core in the axial direction of the rotor.

3. A rotary electric machine according to claim 1, wherein the coolant passage has a helical passage, and
   the plate includes a coolant inlet and a coolant outlet that are connected to two ends of the coolant passage, respectively.

4. A rotary electric machine according to claim 3, wherein an axial direction of the helical passage is parallel to the axial direction of the rotor.

5. A rotary electric machine according to claim 1, wherein the electric part is mounted on the plate of the cooling unit.

6. A rotary electric machine according to claim 5, further comprising:
   a cover, which is mounted on the plate of the cooling unit so that the cover protects the electric part.

7. A rotary electric machine according to claim 6, further comprising an electric terminal, wherein
   the electric terminal is mounted on the plate of the cooling unit, is protruded from the cover, and connects to an external power supply so that the external power supply supplies an electric power to the electric part through the electric terminal.

8. A rotary electric machine according to claim 5, wherein the electric part is mounted on one side of the plate of the cooling unit, and the other side of the plate faces the stator core.

9. A rotary electric machine according to claim 1, further comprising a bearing, wherein the rotor is rotatably supported with the plate of the cooling unit through the bearing.

10. A rotary electric machine, comprising:
    a stator core, which has a cylindrical shape and includes a slot therein;
    a rotor, which is rotatably supported inside of the stator core;
    a casing, which accommodates the rotor and the stator core;
    a stator coil, which is inserted in the slot of the stator core, and includes a coil end protruded from a side face of the stator core;
    a cooling unit, which includes a coolant passage; and
    an electric part, which is mounted on the cooling unit, and controls the stator coil, wherein
    the cooling unit is accommodated in a space defined by a side face of the stator core and an outer circumference wall of the coil end, and contacts the side face of the stator core,
    the coolant passage of the cooling unit is annular,
    the cooling unit includes a plate and a body,
    the coolant passage is disposed in the body and has an opening,
    the opening is opened in the axial direction of the rotor, and
    the plate has a ring plate shape and adheres to the body of the cooling unit so that the plate seals the opening of the coolant passage.

11. A rotary electric machine according to claim 10, further comprising:
a through bolt for bolting the body and the plate of the cooling unit and the stator core in the axial direction of the rotor.

12. A rotary electric machine according to claim 10, wherein
the coolant passage has a helical passage, and
the plate includes a coolant inlet and a coolant outlet that are connected to two ends of the coolant passage, respectively.

13. A rotary electric machine according to claim 12, wherein an axial direction of the helical passage is parallel to the axial direction of the rotor.

14. A rotary electric machine according to claim 10, wherein the electric part is mounted on the plate of the cooling unit.

15. A rotary electric machine according to claim 14, further comprising:
a cover, which is mounted on the plate of the cooling unit so that the cover protects the electric part.

16. A rotary electric machine according to claim 15, further comprising an electric terminal, wherein the electric terminal is mounted on the plate of the cooling unit, is protruded from the cover, and connects to an external power supply so that the external power supply supplies an electric power to the electric part through the electric terminal.

17. A rotary electric machine according to claim 14, wherein the electric part is mounted on one side of the plate of the cooling unit, and the other side of the plate faces the stator core.

18. A rotary electric machine according to claim 10, further comprising a bearing, wherein the rotor is rotatably supported with the plate of the cooling unit through the bearing.

* * * * *